United States Patent
Panasik

(10) Patent No.: US 6,590,884 B1
(45) Date of Patent: Jul. 8, 2003

(54) METHOD AND APPARATUS PROVIDING SPATIAL DIVERSITY WITHIN AN INDOOR NETWORK

(75) Inventor: Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/226,578

(22) Filed: Jan. 7, 1999

(51) Int. Cl.<sup>7</sup> ............... H04L 1/06; H04J 3/00; H04B 7/08; G01S 3/72
(52) U.S. Cl. ............ 370/338; 370/312; 370/345; 375/299; 375/347
(58) Field of Search .................. 370/276, 277, 370/294, 310, 312, 328, 338, 334, 345, 432, 437; 375/267, 299, 347; 455/101, 137

(56) References Cited

U.S. PATENT DOCUMENTS

| | | | | |
|---|---|---|---|---|
| 5,546,397 A | * | 8/1996 | Mahany | 370/310 |
| 5,745,479 A | * | 4/1998 | Burns et al. | 370/245 |
| 5,771,017 A | * | 6/1998 | Dean et al. | 342/374 |
| 5,870,430 A | * | 2/1999 | Pipon et al. | 375/229 |
| 5,944,659 A | * | 8/1999 | Flach et al. | 600/300 |
| 5,960,344 A | * | 9/1999 | Mahany | 455/432 |
| 5,987,062 A | * | 11/1999 | Engwer et al. | 370/251 |
| 5,991,287 A | * | 11/1999 | Diepstraten et al. | 370/338 |
| 6,049,533 A | * | 4/2000 | Norman et al. | 370/328 |
| 6,259,687 B1 | * | 7/2001 | Lomp et al. | 370/334 |
| 6,259,898 B1 | * | 7/2001 | Lewis | 370/338 |

* cited by examiner

*Primary Examiner*—Hassan Kizou
*Assistant Examiner*—Ahmed Elallam
(74) *Attorney, Agent, or Firm*—Ronald O. Neerings; Wade James Brady, III; Frederick J. Telecky, Jr.

(57) ABSTRACT

A method and architecture that provides network level spatial diversity using multiple indoor access points (70) has a transceiver coupled to each wireless computing device on the network. Signals from each wireless computing device are transmitted to more than one access point on the network. The signal is sampled and aligned to permit calculation of amplitude and phase values at each point as a function of time. The phase and amplitude data are stored and used to create a vector matrix associated with the specific computing device which can be continuously updated as the computing device is moved from one location to another within the network environment.

11 Claims, 4 Drawing Sheets

METHOD AND APPARATUS PROVIDING SPATIAL DIVERSITY WITHIN AN INDOOR NETWORK

TECHNICAL FIELD

The present invention relates in general to the field of wireless communications and more particularly to a method and apparatus that provides spatial diversity within an indoor network.

BACKGROUND OF THE INVENTION

The background of the invention is described in connection with wireless communications in an indoor network environment having multiple access points to the network backbone.

At present, Wireless Local Area Networks ("WLANs") provide multiple access points with a point-to-point Radio Frequency ("RF") connection for access to network systems. At high data rates, the network environment contains multi-path nulls which inhibit full data-rate communications and require significant processing to mitigate. In addition, many users compound the problem by increasing the background interference level. A major cause of these problems is that the access points operate independently and perform primitive hand-offs amongst users.

At the same time, third generation cellular standards ("CDMA"), such as CDMA 2000, ESI, ARIB, etc., are enabling private access points for wireless data communications using private, indoor base stations for data rates up to 2 Megabits per second ("Mbps"). Generally, the mobile station is comprised of a hand-held communicator placed in close proximity to the computing device (coupled to each other via infrared link), or a PCMCIA card inserted into the notebook computer.

A common technique used to separate several devices in a wireless environment is to spread the data by convolving a symbol for each character that identifies the base station from which it originated. For example, a data rate of 2 Mbps corresponds to a chipping rate of 4 Mega Chips Per Second ("MCPS") wherein each data character is represented by a symbol that is 2 bits long, i.e. 2 chips per bit.

Compared to normal voice communications which code up to 128 chips per bit (an 8 kilobyte per second voice data channel) third generation cellular systems typically use relatively short codes, which are known as Walsh codes, for mobile station segregation and identification. Such coding schemes are prone to data errors especially in very high capacity network environments where each base station is associated with a single code. While error correction and data recovery algorithms can be used to improve data integrity, such methods tend to decrease throughput, create bottlenecks or in some cases result in loss of data.

Thus, signal interference tends to increase with the amount of data traffic. In heavily utilized business environments where several hundreds telephones and notebook computers may be operated, reliable error-free communications may be impossible.

In addition, since cellular networks were originally designed for outdoor use, CDMA modulation techniques do not specifically address the problems unique to multi-path interference due to enclosed walls and ceilings. Present day CDMA standards are optimized for outdoor communication where the objects (reflectors) are very large. Indoor environments have many more reflections of small delay which confound the spreading code used for outdoors. For example, while an echo (multipath) may be understood by a human as an indications of being in a large room, a mobile computing device such as a notebook computer may mistake the same multipath (echo) as originating from some other device on the network.

WLAN devices permitting wireless access to network connections are available. Such devices typically include a RF transceiver card that interfaces with the computing device which in most cases is a notebook computer. A similar device is attached to or placed near a network access point permitting bi-directional communications between the computer and other network components.

Such WLAN devices are limited, however, to a range of about 50 meters. Moreover, such devices do not typically control the power in their antennas and, as such, cannot support a large number of mobile computers in a single network environment. For example, many WLAN transceivers sets limit the number of mobile computers to 4 or 5 units in a 50-meter cell.

Another limitation associated with present day WLAN systems is that they use carrier frequencies which are largely unregulated and available for use by a wide array of consumer electronic equipment such as microwave ovens at 2.45–2.50 Ghz and cordless phones which employ a carrier frequency of either 900–928 Mhz or 2.4–2.482 Ghz. Thus, the potential for signal interference with consumer electronics in these bands is high and unpredictable.

SUMMARY OF THE INVENTION

Third generation cellular systems will include downlink data rates of at least 2-Mbps utilizing very weak CDMA techniques known as short Walsh codes. These weak (<64 bit) codes will not permit effective mitigation of interference from other users and multi-paths in the indoor environment.

Accordingly, disclosed is a method and system of determining the spatial distinctiveness of a plurality of computing devices within a wireless networked environment. A signal is transmitted from a mobile computing device to a group of access points (APs) within the network as opposed to a single AP. Each access point receives the signal and converts it to its digital equivalent for digital processing. The converted signal is sampled and reduced to a set of vector data that is aligned in amplitude and phase to create a vector matrix specific to the communicating device.

Over-sampling of the converted digital signal ensures enough resolution to enable precise spatial determination of the computing device depending on the phase difference of the signal with respect to each access point. The vector data is aligned in time and mathematically combined to achieve a unique set of vector points for each mobile computing device. Thus, communication during movement of the computing device is made possible since multi-path communications are enhanced using the spatial representation of all computing devices on the network. Even when the device is fixed in space, the environment is ever changing due to moving people, equipment and doors.

In another embodiment, the aligned vector matrix is forwarded to other network components using the network interface and established network protocols. Since the same data is transmitted to and received by several APs, the vector matrix permits a determination as to whether a signal is emanating from a desired location (constructive interference) or from some other source of interference (destructive interference).

In yet another embodiment, a network data signal is distributed to several APs after modification by the vector alignment matrix. Multiple APs transmit the amplitude and phase modulated waveform which constructively converges on the space occupied by the deserved mobile transceiver.

Also disclosed is an architecture for providing network-level spatial diversity using multiple indoor access points. A transceiver is coupled to a user's portable computer or similar mobile computing device. Signals from the computing device are received by more than one access point on the network. The incoming signals are sampled and aligned to permit calculation of the phase and amplitude differentials at each point as a function of time. The phase and amplitude data are stored in the network to create a vector matrix for the computing device which can be updated continuously as the computing device is moved from one location to another within the network environment. A code can be assigned to the vector matrix that is associated with the computing device. In this way, all signals within the network can be associated with a specific network component as a function of the component spatial orientation. Other aspects and advantages of the invention including its specific implementations are understood by reference to following detailed description taken in conjunction with the accompanying drawings.

DESCRIPTION OF THE DRAWINGS

The advantages of the present invention may be better understood by referring to the following description in conjunction with the accompanying drawings, in which.

DETAILED DESCRIPTION OF THE PREFERRED EMBODIMENTS

Figure 1:
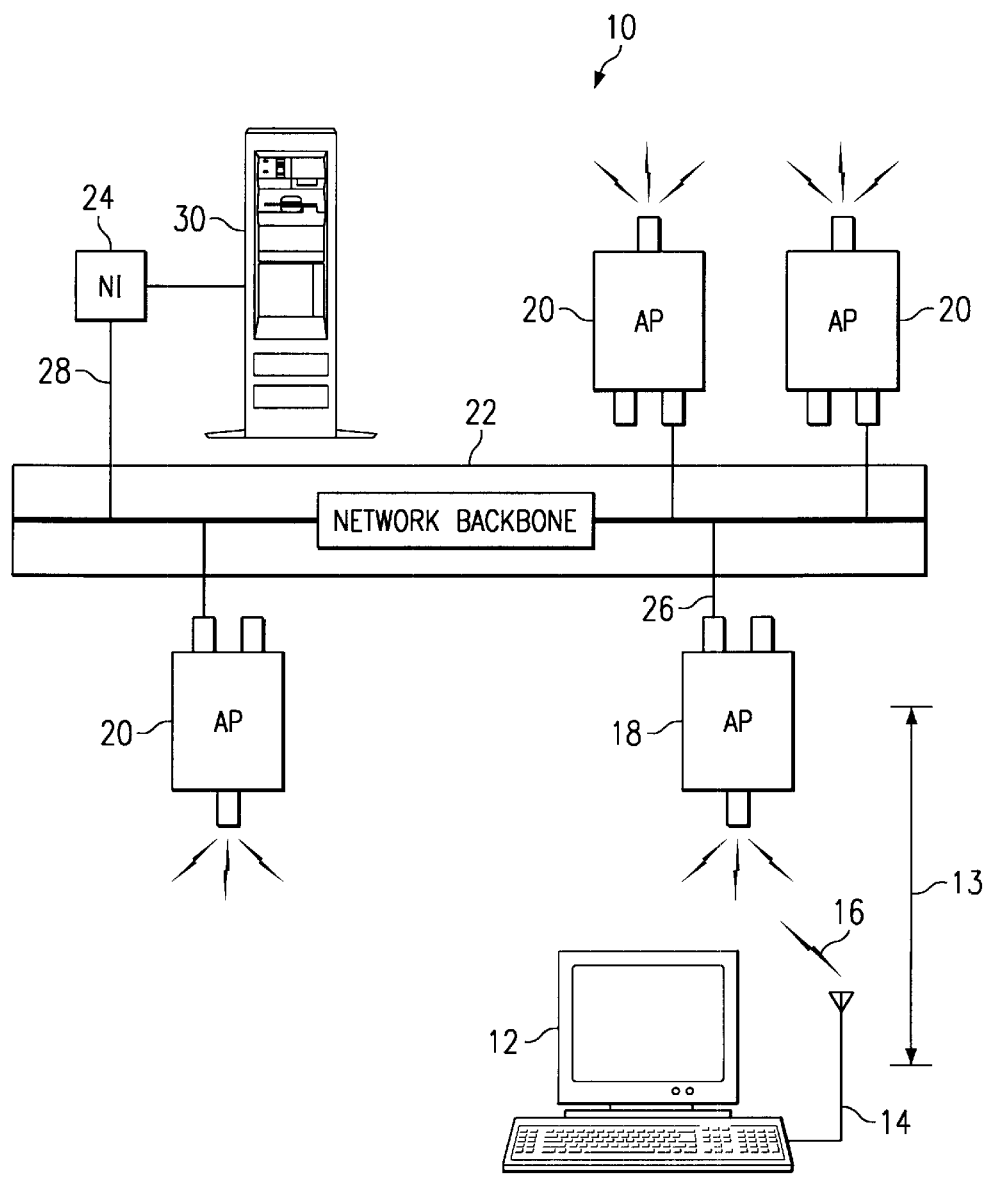
FIG. 1 illustrates a prior art wireless a network environment.

In reference to FIG. 1, a prior art wireless network environment is shown and denoted generally as 10. A wireless computing device 12, such as a notebook computer, hand-held personal computer or other similar mobile computing platform, communicates with other network devices (not shown) using an antenna 14. Signals 16 from the antenna 14 of the wireless computing device 12 could be received by several access points but is assigned to a single access point 18, which typically corresponds to the access point in closest proximity to the wireless computing device 12 thus providing the strongest signal 16. The strength of the signal 16 at the single access point 18 depends on the distance between the wireless computing device 12 and the single access point 18.

The wireless network environment 10 is arranged to provide switch diversity for the various devices on the network. Using switch diversity, the single access point 18 that provides the best signal-to-noise ratio for each wireless computing device 12 is chosen from all the access points 18 and 20. Thereafter, communications to and from the wireless computing device 12 continue through the single access point 18, as long as the wireless computing device 12 is within the reception range 13 of the single access point 18.

The other access points 20 are also available but remain unused by the computing device 12 since they are geographically distant from the wireless computing device 12. Although a fraction of the signal 16 from the computing device 12 will reach the other access points 20, the network interface 24 to the server 30 will ignore such stray signals if the signal-to-noise ratio at each of the other access points 20 is below a predetermined reception threshold. The other access points 20, may have sufficient signal for demodulation if sufficiently close to computing device 12.

The single access point 18 and the other access points 20 are connected to the network backbone 22 via communication links 26. Depending on the network configuration, the network backbone 22 can be of any suitable medium such as Ethernet cabling or similar connections means according to relevant industry standards. Typically, the network backbone 22 has a data bandwidth of more than fifty (50) times that of the signal 16.

Similarly, the network interface 24 is coupled to the network backbone 22 via communication link 28, which provides a uniform signal interface to the server 30. Typically, a hard wire connection exists between the network interface 24 and the network backbone 22 as well as between the network interface 24 and the server 30. Whether wireless or fixed, each device 12, 24, 30 within the wireless network environment 10 communicates through a specified communications channel such that the single access point 18 and the other access points 20 do not recognize any signals emanating from unrelated or unattached network devices.

Figure 2:
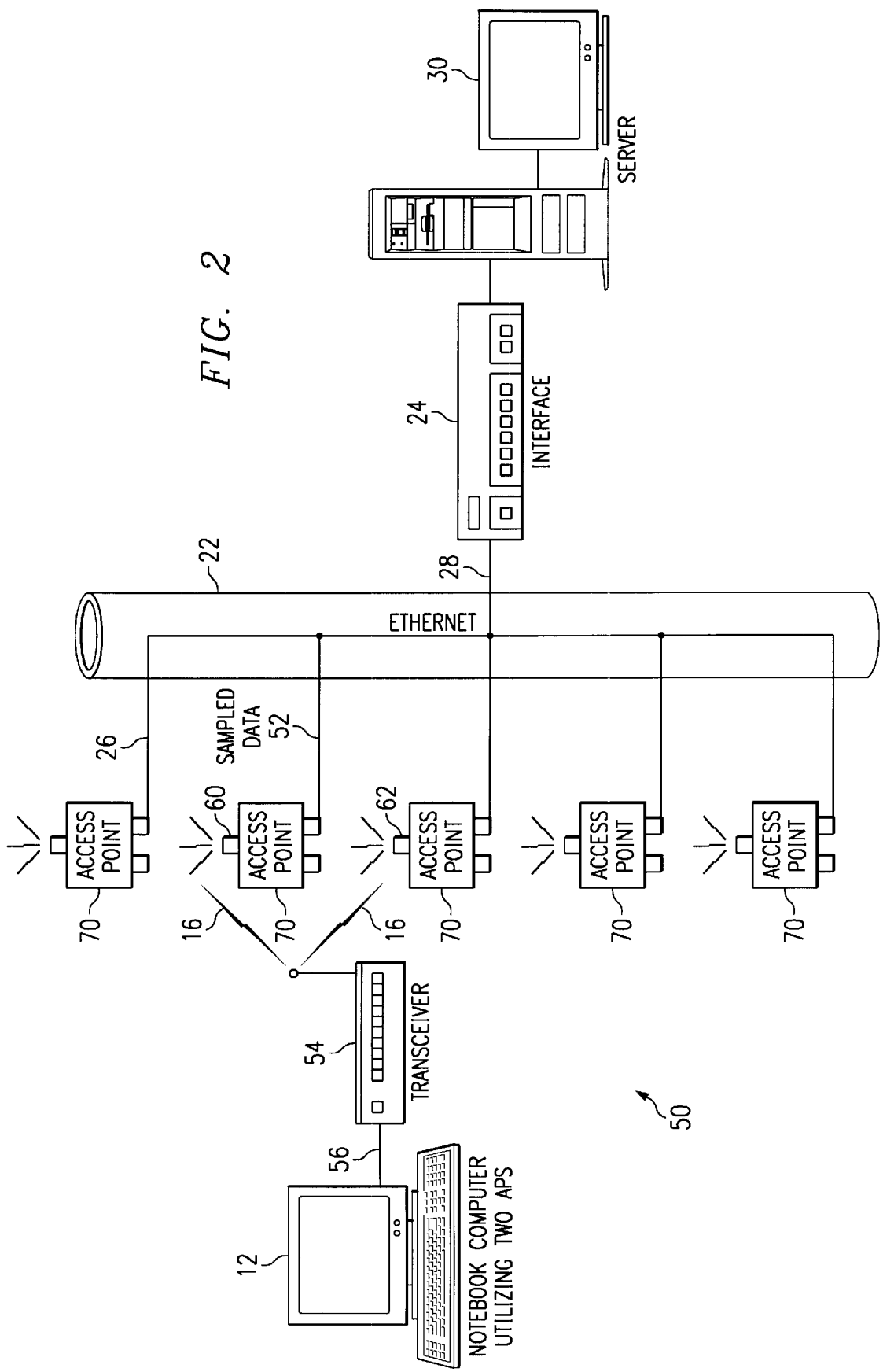
FIG. 2 illustrates a wireless network environment having multiple access points to achieve spatial diversity in accordance with an embodiment of the present invention.

Turning to FIG. 2, a wireless network architecture permitting true spatial diversity using multiple access points 70 is shown and denoted as 50. The multiple access points 70 have been modified to permit hand off as the computing device is moved from location to location within the network 50. The multiple access points 70 are coupled to the network backbone 22 via communication link 26, which can be of indefinite length permitting a varying number of access points 70 to be used on the network 50 depending on spreading code rate and total number of users. A mobile computing device 12 communicates with other network devices (not shown) using a wireless transceiver 54 to transmit and receive signals.

Each of the multiple access points 70 has a built-in transceiver means (not shown) to receive and transmit signals 16 between the wireless computing device 12 and other network devices such as the server 30. The present invention provides spatial diversity by utilizing more than one multiple access point 70 to communicate with the wireless computing device 12 to continuously determine the location of the wireless computing device 12 within the wireless network environment 50.

As with most cellular systems, power control and frequency re-use provide increased utilization of a given frequency band. Several access points 70 provide spatial diversity with respect to each wireless computing device 12 on the network by taking advantage of the fact that many multiple access points 70 can be used to communicate with a wireless computing device 12 at a single location. The wireless network environment 50 can adjust the phase and amplitude of the transmitted signal 16 at each multiple access point 70 so that the signals 16 constructively combine at the location of the wireless computing device 12.

Thus, the present invention provides superior performance in high utilization network environments where other devices, such as cellular phones, copiers, hard-wired computers, etc., may create destructive interference that limits the useful range of wireless computing devices and prohibits their movement about the wireless network environment. Within these limitations, current CDMA protocols provide for varying tevels of signal code diversity intended to enhance the signal-to-noise ratio of the transmission system and permit identification of a specific network device. For example, code diversity is used to associate a specific code with a specific mobile user.

By using the wireless network environment 50 to provide spatial diversity, many wireless computing devices 12 can be physically located and moved within the wireless network environment 50. Preferably, the identical network components can be utilized by placing the burden on the wired network 70 building infrastructure where there is a source of electrical power. This saves power of the computing device 12 which is often a battery operated portable computer.

Preferably, the antennas are located sufficiently far apart to permit phase and amplitude differentiation between the antennas for a given signal. A difference of several wavelengths in the carrier frequency should provide enough distance to enable precise positioning of the wireless computing device 12 within the wireless network environment 50. Regarding network diversity reception, sampled data 52 from several access points 70 is combined and demodulated at the interface to the backbone 22.

Figure 3:
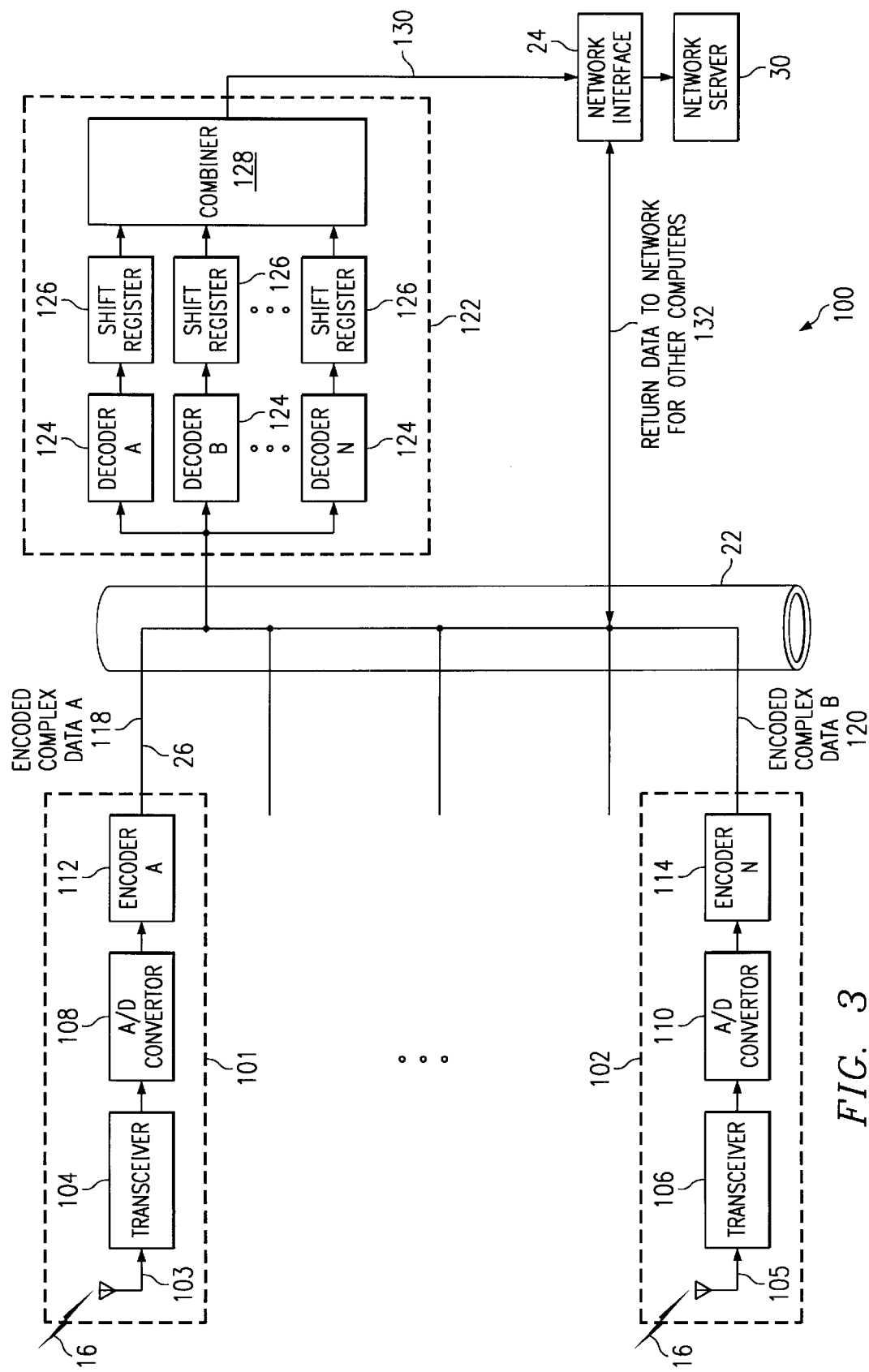
FIG. 3 illustrates a block diagram of a multi-port receiver interface in accordance with an embodiment of the present invention.

Referring now to FIG. 3, a block diagram of the multi-port receiver interface to the backbone 22 using several multiple access points, two, 101 and 102 are shown and denoted generally as 100. Multiple access point 101 comprises an antenna 103, a transceiver 104, and A/D over-sampling converter 108 and an encoder 112. The multiple access point 101 receives a single modulated signal 16 from a wireless computing device 12 (FIG. 2) via the antenna 103. The transceiver 104 then amplifies, filters and demodulates the signal 16. The A/D converter 108 then samples the signal 16.

Preferably, each A/D converter 108 and 110 over-samples the signal 16 at a rate much higher than the baud rate of the signal 16 to provide sufficient resolution for phase and amplitude distinction at each network access point 70. Another possible phase reference could be established via a common RF pilot tone broadcast to all APs in a given room. Note, each AP can read at least the nearest AP via RF signal. Next, the converted digital signal is encoded by encoder 112 or 114 with a special code associated with the multiple access point 101 where the analog signal was received in order to later separate the signals on the network backbone 22.

The output from encoder 112 is then transmitted to the network backbone 22 via the network cabling 26. Next, the encoded complex data strings 118 and 120 reach the phase alignment block 122 wherein each data string is decoded 124 to reveal the specific multiple access point 70 from which the data string originated. Return data to the network backbone 22 for other computers is transmitted via communications link 132. The purpose of the phase alignment block 122 is to provide a reference point for the data strings (e.g. 118 and 120) and to permit mathematical derivation of relative phase and amplitude values for the signal 16 as received at each multiple access block 101 and 102. Thus, the output of the decoders 124 is received by shift registers 126 which perform a bit-wise shift of the (over sampled) data string until a common reference is obtained. The shift registers 126 perform time alignment, which is obtained from the received signal in half-duplex mode. In one embodiment, the shift registers 126 key off the special code encoded in the data string (e.g., at 112, and 114) in the interface blocks 101 and 102. Other methods of alignment may also be employed.

Next, the results obtained by the shift registers 126 are combined at block 128 into a vector matrix associated with the specific wireless computing device 12 (FIG. 2) that transmitted the signal 16. The vector matrix is then used by the network server 30 via the network interface 24 to determine the precise spatial arrangement of the wireless computing device 12 (FIG. 2) since for any given location of the computing device the phase and amplitude values at each access point 70 on the network 50 are distinct.

Now briefly referring back to FIG. 2, in one embodiment, the vector matrix can be continuously updated as the wireless computing device 12 is moved from location to location to reflect the current spatial orientation within the wireless network environment 50. Thus, the present invention also provides a method for determining the spatial distinctiveness of one or more wireless computing devices within the wireless network environment. First, a signal 16 is transmitted from one or more of the wireless computing devices to a group of multiple access points 70 across the wireless network environment 50. Next, the signal 16 is converted from analog to digital at each multiple access point 70. Preferably, the signal 16 is over-sampled to permit enough resolution for accurate vector data.

The individual data streams from each multiple access point 70 are combined into a matrix containing more than one value of phase and amplitude as a function of time. Since the vector data is known to originate with a specific wireless computing device within the wireless network environment 50, the vector matrix is unique to the wireless computing device and represents its spatial diversity within the wireless network environment. In one embodiment, a special code is assigned to the matrix which relates it to the transmitting device on the network 50.

Figure 4:
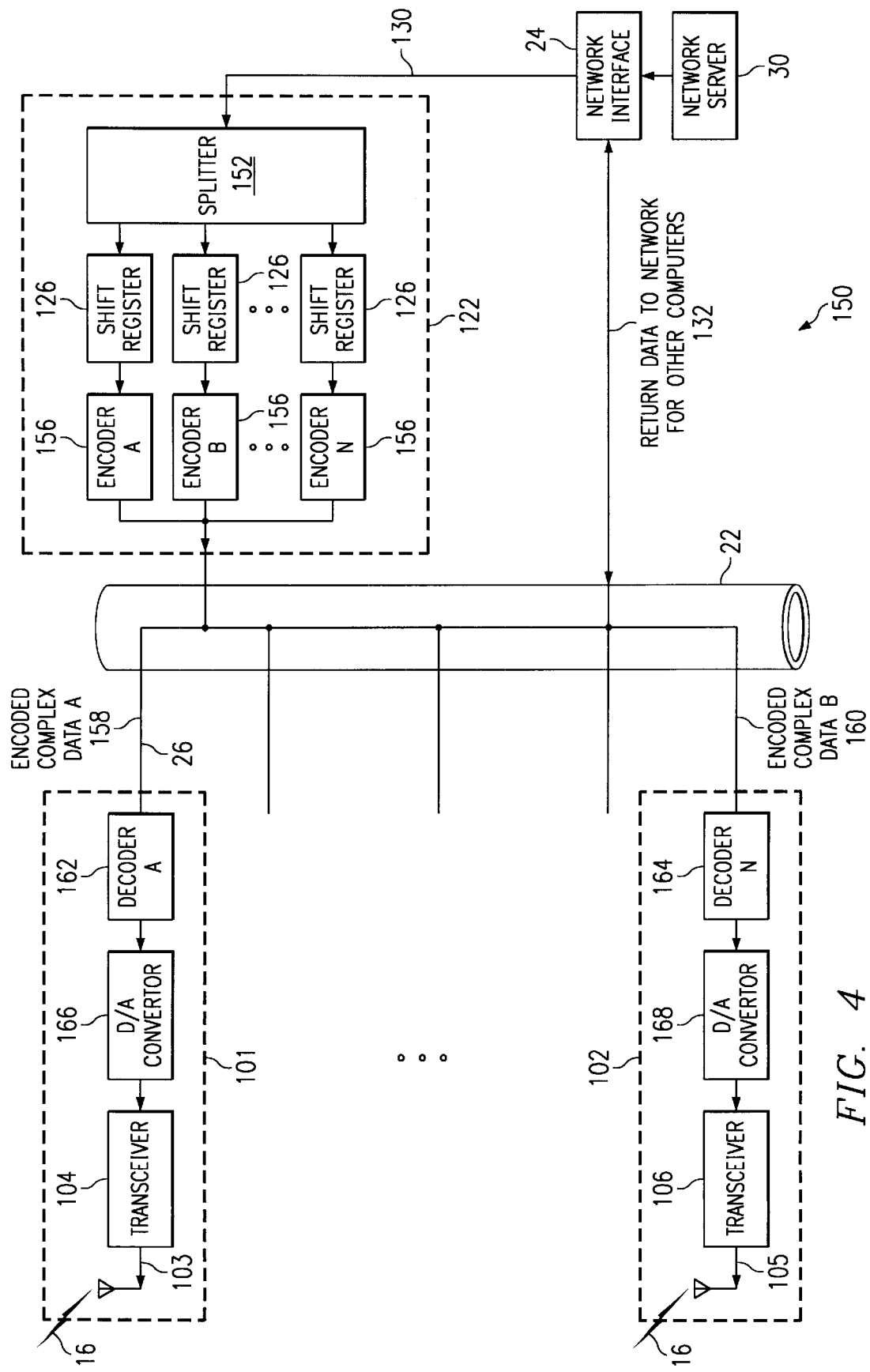
FIG. 4 illustrates a block diagram of a multi-port transmitter interface in accordance with an embodiment of the present invention; and Corresponding numerals in the figures refer to corresponding parts unless otherwise indicated.

Now referring to FIG. 4, a block diagram of the multi-port transmitter interface to the backbone 22 using two multiple access points 101 and 102 is shown and denoted generally as 150. Whenever a message is to be sent from the network server 30 to the wireless computing device 12 (FIG. 2), the message is sent to the network interface 24, which routes the message to the phase alignment block 122. The splitter 152 splits the message according to the vector matrix, derived during reception, into the proper phase and amplitude components for each multiple access point that is going to transmit the message. The shift registers 126 then properly time aligns the signals, which are then encoded by encoders 156 and transmitted to the network backbone 22.

Next, the encoded complex data strings 158 and 160 reach the multiple access points 101 and 102, respectively. The data strings (e.g. 158 and 160) are decoded by decoders 162 and 164 and converted to analog signals by D/A converters 166 and 168, respectively. The signals are then transmitted to the wireless computing device 12 (FIG. 2) via the transceivers 104 and 106 and the antennas 103 and 105.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of determining the spatial distinctiveness of a plurality of computing devices within a wireless networked environment comprising the steps of:

transmitting a signal from at least one of said computing devices to a group of access points on the network;

converting the signal from an analog to a digital equivalent using over-sampling to obtain a plurality of vector data, at each access point within the group; and combining the vector data into a vector matrix, said vector matrix containing a plurality of amplitude and phase versus time data associated with at least one of said computing devices so that the spatial location of said computing device in said network environment may be determined.

2. The method according to claim 1 further comprising the steps of:

receiving the vector matrix; and de-encoding the vector matrix to determine the spatial location of the specific computing device associated with said vector matrix.

3. The method according to claim 2 further comprising the steps of:

aligning the data in the vector matrix; and combining the aligned vector matrix data to create a spatial diversity matrix associated with a specific one of said computing devices.

4. The method according to claim 3 further comprising the step of transmitting the spatial diversity matrix to a network interface element.

5. The method according to claim 1 wherein a step of aligning the data in the vector matrix involves phasing all the signals coherently about a given point in space.

6. The method according to claim 1 wherein a step of aligning the data in the vector matrix involves phasing all the signal coherently about a given point in space and the step of modulating the data utilizes a separate code for each antenna.

7. A wireless network with network level spatial diversity comprising:

a network backbone having a network interface with a network server;

a plurality of access points coupled to said backbone;

at least one computing device in wireless communications with said network server through more than one of said access points;

wherein said access points are configured to provide the spatial diversity of said computing device within the network environment spanned by said access points; and wherein each one of said plurality of access points further comprise:

an encoder having an output terminal coupled to said network backbone and an input terminal;

an Analog-to-Digital Conversion (ADC) circuit having an output terminal coupled to said input terminal of said encoder, said ADC conversion circuit further having an analog input; and a transceiver means coupled to said analog input of said ADC conversion circuit.

8. The wireless network according to claim 7 further comprising an antenna coupled to said transceiver for receiving signal from network entities.

9. The wireless network according to claim 7 wherein said ADC is configured to over-sample signals received from computing devices within the network.

10. The wireless network according to claim 7 wherein said encoder is configured to encode the output from said ADC with a special code associated with at least one access point on the network.

11. The wireless network according to claim 7 wherein said transceiver means locks onto a common broadcast RF pilot tone.

* * * * *